(12) United States Patent
Murray

(10) Patent No.: US 6,202,868 B1
(45) Date of Patent: Mar. 20, 2001

(54) COLLAPSIBLE HOIST

(76) Inventor: David N. Murray, c/o MCS Industrial Contractors Inc., 5111 Hubalta Road SE, Calgary, AB (CA), T2B 1T5

(*) Notice: Subject to any disclaimer, the term of this patent is extended or adjusted under 35 U.S.C. 154(b) by 0 days.

(21) Appl. No.: 09/270,996

(22) Filed: Mar. 15, 1999

(51) Int. Cl.$^7$ .............. B66C 23/62; A22B 1/00; B60P 9/00
(52) U.S. Cl. .......... 212/294; 212/292; 212/299; 212/227; 414/462; 452/187; 452/189; 254/325
(58) Field of Search .................. 212/292, 294, 212/299, 360, 227, 232, 241, 255, 263, 180, 901; 414/462; 248/292.14; 254/325, 335, 336, 398, 415; 452/185, 187, 189, 190, 191, 125, 126

(56) References Cited

U.S. PATENT DOCUMENTS

| | | | |
|---|---|---|---|
| 45,865 | * 1/1865 | Rogers | 212/294 |
| 3,854,168 | * 12/1974 | Bradley | 452/189 |
| 4,338,703 | * 7/1982 | Tanner | 452/187 |
| 4,419,038 | 12/1983 | Pendergraft . | |
| 4,673,148 | * 6/1987 | Oliver | 248/292.14 |
| 4,881,864 | 11/1989 | Amato . | |
| 4,955,358 | * 9/1990 | Harris et al. | 248/292.14 |
| 5,090,580 | 2/1992 | Nelson . | |
| 5,195,726 | * 3/1993 | Kaner | 254/325 |
| 5,431,526 | 7/1995 | Peterson et al. . | |
| 5,445,281 | * 8/1995 | Hung | 212/292 |
| 5,445,487 | 8/1995 | Koscinski, Jr. . | |
| 5,520,498 | 5/1996 | DiBartolomeo . | |
| 5,588,907 | * 12/1996 | DePietro et al. | 452/187 |
| 5,662,451 | 9/1997 | Muzzi et al. . | |
| 5,752,799 | 5/1998 | Carey et al. . | |

FOREIGN PATENT DOCUMENTS

| 1273359 | * 7/1968 | (DE) | 452/189 |
|---|---|---|---|
| 1273381 | * 5/1972 | (GB) | 212/901 |

* cited by examiner

Primary Examiner—Robert P. Olszewski
Assistant Examiner—R. B. Johnson
(74) Attorney, Agent, or Firm—Bennett Jones

(57) ABSTRACT

A vertical lift hoist and winch is taught which can be used, for example, for suspending wild game animals for the purpose of field dressing. The assembly is collapsible without any disassembly of major parts, to be able to fold up into a convenient carrying position, or to be capable of storage in a normal automobile truck, Jeep or station wagon compartment or a truck tool box. The winch lift assembly permits convenient storage and ease of set-up, where all pieces are held together as one. The pulley's are recessed in the upper boom which allows a tight closure in the collapsed position which is an advantage over other types of lifts. Nothing hangs down below the boom, thereby eliminating any cable tangles or interference when setting up or storing.

12 Claims, 2 Drawing Sheets

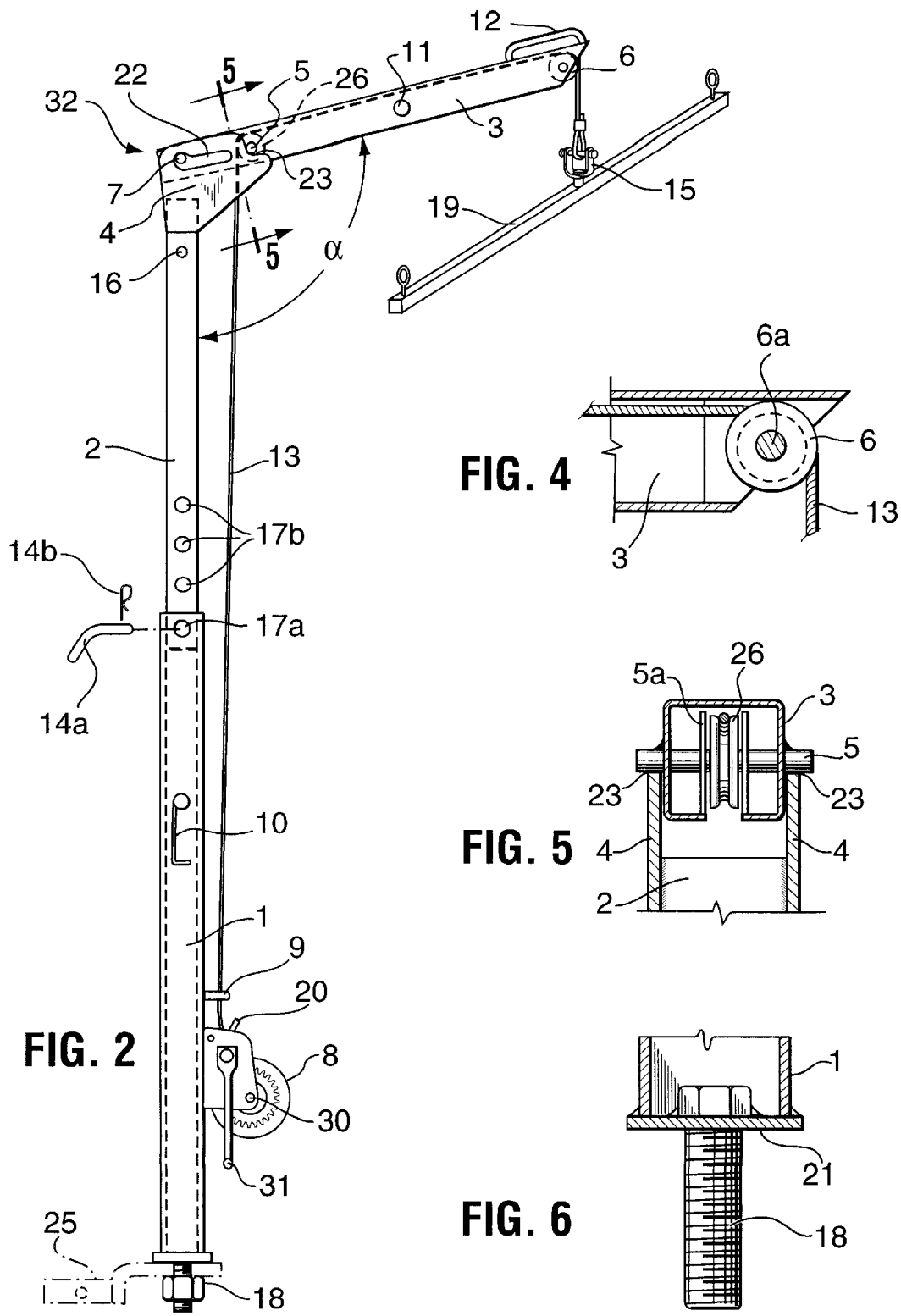

COLLAPSIBLE HOIST

FIELD OF THE INVENTION

This invention is directed to a hoist and, in particular, to a hoist which is collapsible for storage.

BACKGROUND OF THE INVENTION

Sportsmen are required to field dress wild game animals. To obtain the best results when field dressing, it is important to remove the hide as quickly as possible, to allow the carcass to cool, and avoid contaminating the carcass with soil, grass etc. Thus, it is beneficial be able to suspend the carcass during field dressing.

Unfortunately most hoists are large and unwieldy preventing their transport to the field. Some collapsible hoists have been invented, but appear not to have become commercially accepted. In particular, prior foldable hoists have required the parts to be completely dismantled resulting in the loss of major parts and causing the assembly procedure to be complicated and time consuming. In addition, the folding procedures of other hoists results in tangles of hoist cables.

A collapsible hoist assembly is required which is safe and easy to use and which is collapsible to a convenient size without the use of special tools and/or without complicated mechanisms.

SUMMARY OF THE INVENTION

A collapsible hoist has been invented and is taught herein which provides for easy assembly for use and quick collapsing for storage. Assembly and collapsing can be accomplished without the use of tools or complicated mechanisms.

In accordance with a broad aspect of the present invention, there is provided a collapsible hoist comprising a support post; an upper boom connected by a pivotal connection to the support post and pivotally moveable relative to the support post between a collapsed position wherein the upper boom is positioned adjacent the support post and an extended position in which the upper boom extends away from the support post at a selected angle and a winch including a cable suspended from the upper boom for lifting a load, the pivotal connection including a pair of gusset plates retaining therebetween the upper boom such that the upper boom is slidable and pivotally moveable therebetween to permit pivotal movement of the upper boom, the gusset plates defining a locking notch for accepting a locking pin on the upper boom, the locking notch and locking pin formed to cooperate to resist forces exerted by the upper boom and tending to move the upper boom into the collapsed position.

In accordance with another broad aspect of the present invention, there is provided a collapsible field dressing hoist comprising a support post; an upper boom connected by a pivotal connection to the support post and pivotally moveable relative to the support post between a collapsed position wherein the upper boom is positioned adjacent the support post and an extended position in which the upper boom extends away from the support post at a selected angle, a winch including a cable suspended from the upper boom for lifting a load and a spreader bar for supporting a carcass, the pivotal connection including a pair of gusset plates retaining therebetween the upper boom such that the upper boom is slidable and pivotally moveable therebetween to permit pivotal movement of the upper boom, the gusset plates defining a locking notch for accepting a locking pin on the upper boom, the locking notch and locking pin formed to cooperate to resist forces exerted by the upper boom and tending to move the upper boom into the collapsed position.

The locking notch is preferably formed as a locking notch formed in the edge of each gusset plate and aligned between the two gusset plates and the lock pin is formed as a pair of pins each formed to seat in the notch of one of the gusset plates and to be formed to be driven into engagement with the locking notch by the force of the upper boom tending to move into collapsed position. The force is caused by the weight of the upper boom and the weight of any load suspended from the upper boom.

In one embodiment, the gusset plates retain the upper boom by use of a pair of slots aligned between the gusset plates and formed to retain a pair of aligned pins extending from the upper boom. The slots are formed to permit the upper boom to move from the collapsed position to the extended position while remaining secured between the gusset plates. Preferably, a recess is formed in each slot for accepting the pins when the locking pin is engaged in the locking notch.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings:

FIG. 2. is a side elevation view of an assembly according to the present invention in the extended "ready for use" position.

FIG. 4 is an enlarged views of a portion of an upper boom of the hoist, with a portion of the upper boom cut away to show a pulley useful in the present invention.

FIG. 5 is a sectional view along line 5—5 of FIG. 2.

FIG. 6. is a side elevation view of the lower end of a hoist support post, with a portion of the post cut away to show a base bolt useful with an assembly according to the present invention for mounting the assembly onto a vehicle.

DETAILED DESCRIPTION OF THE PRESENT INVENTION

Figure 1:
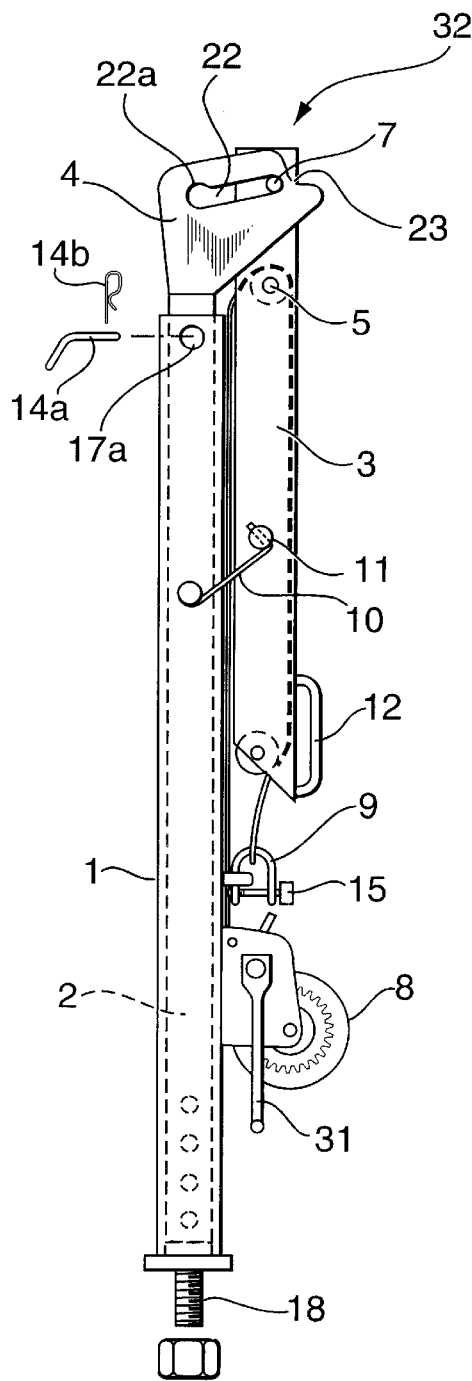
FIG. 1. is a side elevation view of an assembly according to the present invention in the collapsed storage position.

Referring to FIG. 1 and FIG. 2, a collapsible hoist assembly according to the present invention is shown. The hoist is collapsible into a position as shown in FIG. 1 and can be easily extended into a position, as shown in FIG. 2, ready for use in hoisting a load such as a game animal.

The hoist includes a support post including a bottom support column 1 and an extension post 2. Bottom support column 1 and extension post 2 are connected to permit adjustment in the length of the support post between a short storage position (FIG. 1) and an extended position (FIG. 2). In the illustrated embodiment, extension post 2 is telescopically disposed within support column 1 and slidable relative thereto to provide for extension of the support post. A lock, including pin 14a and cotter pin 14b and holes 17a and 17b, is provided for locking the support post in the extended position. Other locks can be used for this purpose, as desired. Other extension arrangements can be used. As an example, to avoid having to align holes 17a and 17b, pin 14a can be passed through a hole which is similar to hole 17a but positioned lower on the post and extension post 2 can be slid within bottom support column 1 to rest on the pin.

Another hole 16 extends through extension post 2 and is positioned to align with hole 17a when the hoist is in the collapsed position. Thus, the support column can be locked in the short storage position and the lock pin can be conveniently stored to prevent loss thereof.

To facilitate use of the telescopically disposed arrangement of bottom support column 1 and extension post 2, preferably, the lower portion of extension post is color coded to allow for visual marking of the accommodating holes for lock pin 14a and to assist the operator in determining when the lower portion of the support post is near.

Figure 3:
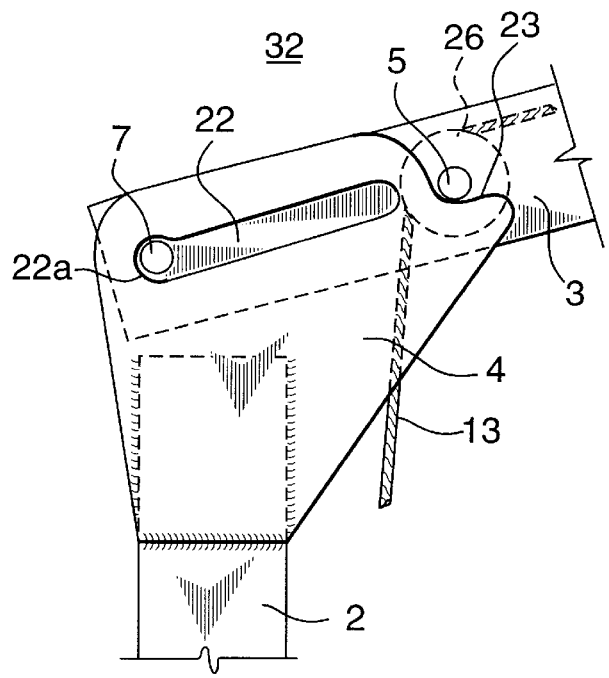
FIG. 3. is an enlarged side elevation view of gusset plates useful with an assembly according to the present invention for holding the upper boom in a secure position.

An upper boom 3 is connected at the outboard end of extension post 2 by a pivotal connection 32. Referring also to FIG. 3, pivotal connection 32 provides for pivotal movement of upper boom 3 relative to extension post 2 between a collapsed position adjacent extension post 2 in which the boom and the extension post lie substantially in parallel and an extended position in which the boom extends out at an angle a from the extension post. Preferably, angle a is at least 80° and in a particularly preferred embodiment, angle a is greater than about 90°. Pivotal connection 32 further permits the upper boom to be locked into the second position extending away from extension post 2. Pivotal connection 32 includes a pair of gusset plates 4 mounted, as by welding, in parallel position on the upper end of extension post 2. Gusset plates 4 include aligned and similarly formed slots 22 which accept and retain aligned pins 7 extending from each side of upper boom 3 adjacent the boom's pivotally connected end. Pins 7 are formed to be retained in the slots 22 but are slidable along the length of the slots. Thus the upper boom is mounted between gusset plates 4, but is moveable therebetween as limited by rotational and sliding movement of pins 7 within slots 22. Slots 22 are formed on gusset plates 4 to permit upper boom to hang down in the collapsed position and also to permit upper boom to be moved into the extended position.

Gusset plates 4 further define a pair of aligned lock notches 23 for locking the boom into the extended position. Lock notches 23 accept and releasably engage a pair of aligned lock pins 5 extending from the sides of upper boom. Lock notches 23 are formed in the gusset plates to accept lock pins 5 and act against forces (i.e. upper boom weight and any load applied thereto) exerted by the upper boom through the lock pins tending to move back into the collapsed position. In the illustrated embodiment, the notches are formed on the edge of the gusset plate opposite the connections to the extension post. This is preferred for ease of manufacture and use.

When it is desired to pivot upper boom 3 into the extended position, upper boom is moved such that pins 7 slide along slots 22 and until pins 5 are engaged in lock notches 23. The upper boom is then releasably locked into the extended position by the weight of the upper boom forcing lock pins 5 into lock notches 23. In a preferred embodiment, aligned recesses 22a are formed in slots 22. Recesses 22a accept and retain pins 7 as a safety lock when lock pins 5 are located in lock notches 23. Any load which is hoisted and suspended on upper boom 3 will act to drive lock pins 5 into greater engagement with lock notches 23 and lock pins 5 act as a fulcrum to drive pins 7 into greater engagement with recesses 22a. Thus, it will be appreciated that the pivotal connection is easy to use, requiring no tools and including no easily damaged components such as springs, hydraulics or threaded connectors.

A winch 8 is secured to the support post on bottom support column 1. Winch 8 includes a spool 30 on which is wound a cable 13. Referring also to FIGS. 4 and 5, cable 13 rides on pulleys 6, 26 and extends to hang freely from boom 3. Preferably each pulley has an axle 5a, 6a which permits the pulleys to rotate freely to facilitate cable transfer. In the illustrated embodiment, axle 5a of pulley 26 is formed integral with lock pins 5. Pulleys 6, 26 are preferably at least partially recessed within the boom to prevent risk of finger pinches and to facilitate folding of the upper boom onto the support column. Cable guides 27 can be positioned within the boom, as shown, to prevent cable 13 from moving out of the cable grooves.

Winch 8 further includes a winch lock 20 for restricting the unreeling of the cable from spool 30. A handle 31 drives spool to reel up cable 13.

A hoist according to the present invention is particularly useful for field dressing of wild game. Thus, a clevis U-bolt 15 and spreader bar 19 can be attached to the cable for use.

The collapsible hoist assembly according to the present invention can be mounted in any suitable way in an upright position for use. In one embodiment, the assembly is intended for use on a vehicle and a connection onto a vehicle bumper or a reese hitch attachment 25. Referring also to FIG. 6, in an embodiment for mounting on a vehicle bumper hitch, a base plate 21 and a bolt 18 are connected at the lower end of bottom support column 1. Any type of vehicle such as, for example, cars, trucks, all-terrain vehicles, trailers and boats, can have a bumper-type hitch attached thereto for accepting the hoist assembly.

Various other useful components can be included on the hoist, as desired. In particular, a latch 10 and bolt 11 can be provided for locking upper boom 3 against the bottom support column when the hoist is in the collapsed position. A eye bolt 9 can be provided for engaging the free end of cable 13 or U-bolt 15 when the hoist is in the collapsed position. A handle 12 can be mounted on the hoist to facilitate handling when in the collapsed position.

In use, the hoist assembly of the illustrated embodiment is attached to a vehicle hitch 25 by base bolt 18. Lock pin 14a is removed, latch 10 is released, clevis U-bolt 15 is released from the retaining eye bolt 9 and the winch lock 20 is released on hand winch 8, allowing the winch to "free spool". Upper boom 3 is swung up and pushed back along slots 22 of the gusset plates 4 until it is locked into position with lock pins 5 seated in lock notches 23 and pins 7 recessed in recesses 22a. Extension post 2 is then lifted up to it's full height and lock pin 14a is inserted through aligned holes 17a, 17b in the bottom support column and extension post. Lock pin 14a is secured with a cotter pin 14b. The hoist is then ready for use.

In one embodiment (not shown), the support post is provided with a pivotal assembly to permit the support post to rotate about its long axis. Thus, once a load is hoisted using the winch, the support post can be rotated to bring the load into a desired position. As an example, in one pivotal embodiment, bottom support post 1 is formed as a cylinder and extension post 2 is also formed as a cylinder and is telescopically disposed within bottom support column 1. In the extended position, extension post 2 rides on a pin extended through bottom support column 1 and is free to rotate within bottom support column to permit the boom to be pivoted.

To collapse the hoist for storage, extension post 2 is lowered into bottom support column 1 after removing pin 14. Upper boom 3 is then pushed upwardly, against gravity, and pulled outwardly away from the gusset plates. These actions unseat lock pins 5 from notches 23 and draw pins 7 out of recesses 22a and along slots 22. Upper boom is then moved down against bottom support column 1. The hoist is then collapsed and can be locked against unfolding and stored.

The components of the hoist are formed of durable materials such as, for example, steel, aircraft steel cable, selected to accommodate a load size which is desired to be lifted using the hoist. As an example, in one embodiment, the hoist is constructed to dead lift 600 lbs and the winch has a dead lift capacity of 900 lbs. No additional straps, tie downs, securing cables are required for use in field dressing of game animals as the strength of the assembly is suitable to accommodate usual carcass weight.

The size of the hoist is also selected with consideration as to the use for which the hoist is intended. In one embodiment, the overall extended height is 6'–8" with an average of 1'–4" above the ground with the vehicle bumper, enabling an average overall height above the ground of more than 7'-0" to the bottom of the spreader bar. This extended height can easily accommodate game animals. The winch hoist assembly has other uses besides animal dressing such as industry light duty service trucks that require to hoist components. Because of it's ease of use and storage the entire assembly can be readily transported to other vehicles by the use of a carrying handle 12 and put into service without any special tools.

It will be apparent that many other changes may be made to the illustrative embodiments, while falling within the scope of the invention and it is intended that all such changes be covered by the claims appended hereto.

What is claimed is:

1. A collapsible hoist comprising a support post; an upper boom connected by a pivotal connection to the support post and pivotally moveable relative to the support post between a collapsed position wherein the upper boom is positioned adjacent the support post and an extended position in which the upper boom extends away from the support post at a selected angle and a winch including a cable suspended from the upper boom for lifting a load, the pivotal connection including a pair of gusset plates each gusset plate including a slot, the slots being aligned between the gusset plates and formed to retain a pair of aligned pivot pins extending from the upper boom, the gusset plates retaining therebetween the upper boom such that the upper boom is slidable and pivotally moveable therebetween to permit pivotal movement of the upper boom relative to the support post while remaining secured between the russet plates, the gusset plates each further defining a locking notch formed in the edge of each gusset plate to each accept a lock pin, the locking notches being aligned between the two gusset plates and the lock pins formed to seat in the notch of one of the gusset plates and to be driven into engagement with the locking notches by the force of the upper boom tending to move into the collapsed position and each slot including a recess formed to accept the pivot pins when the lock pins are engaged in their locking notches, the locking notches and lock pins and the recesses formed to cooperate to resist forces exerted by the upper boom and tending to move the upper boom into the collapsed position.

2. The collapsible hoist as in claim 1 wherein the cable rides on pulleys mounted at least in part within the upper boom.

3. The collapsible hoist as in claim 1 wherein the support post is formed to have an adjustable height.

4. The collapsible hoist as in claim 3 wherein the support post includes a bottom support column, an extension post telescopically disposed with the bottom support column and a lock assembly for locking the extension post in an telescopically extended position.

5. The collapsible hoist as in claim 4 wherein the lock assembly includes a lock pin for inserting through alignable apertures on the bottom support column and the extension post and a portion of the extension post about its apertures having a surface coloration different than the extension post surface coloration above this area.

6. The collapsible hoist as in claim 1 used for field dressing and including a spreader bar suspended from the cable.

7. The collapsible hoist as in claim 1 further comprising a vehicle attachment means connected at an end of the support post.

8. A collapsible hoist comprising:

a support post including a bottom support column, an extension post telescopically disposed with the bottom support column and a lock assembly for locking the extension post in an telescopically extended position, the lock assembly including a lock pin for inserting through alignable apertures on the bottom support column and the extension post;

an upper boom connected by a pivotal connection to the support post and pivotally moveable relative to the support post between a collapsed position wherein the upper boom is positioned adjacent the support post and an extended position in which the upper boom extends away from the support post at a selected angle, the pivotal connection including a pair of gusset plates each gusset plate including a slot, the slots being aligned between the gusset plates and formed to retain a pair of aligned pivot pins extending from the upper boom, the gusset plates retaining therebetween the upper boom such that the upper boom is slidable and pivotally moveable therebetween to permit pivotal movement of the upper boom relative to the support post while remaining secured between the gusset plates, the gusset plates each further defining a locking notch for accepting a lock pin, the locking notches being aligned between the two gusset plates and the lock pins each being formed to seat in the notch of one of the gusset plates and to be driven into engagement with the locking notches by the force of the upper boom tending to move into the collapsed position and each slot including a recess formed to accept the pivot pin retained in that slot when the locking pins are engaged in the locking notches, the locking notches and locking pins and the recesses formed to cooperate to resist forces exerted by the upper boom and tending to move the upper boom into the collapsed position; and a winch including a cable suspended from the upper boom for lifting a load.

9. The collapsible hoist as in claim 8 wherein a portion of the extension post about its apertures has a surface coloration different than the extension post surface coloration above this area.

10. The collapsible hoist as in claim 8 used for field dressing and including a spreader bar suspended from the cable.

11. The collapsible hoist as in claim 8 further comprising a vehicle attachment means connected at an end of the support post.

12. The collapsible hoist as in claim 8 further comprising a latch for locking the upper boom against the support post when the hoist is in the collapsed position.

\* \* \* \* \*